C. STOLL.
Machines for Polishing Malt.

No. 140,316.　　　　　　　　　　Patented June 24, 1873.

Witnesses:　　　　　　　　　　Inventor:

UNITED STATES PATENT OFFICE.

CHARLES STOLL, OF BROOKLYN, NEW YORK.

IMPROVEMENT IN MACHINES FOR POLISHING MALT.

Specification forming part of Letters Patent No. 140,316, dated June 24, 1873; application filed April 16, 1873.

*To all whom it may concern:*

Be it known that I, CHARLES STOLL, of Brooklyn, in the county of Kings and State of New York, have invented a new and Improved Apparatus for Polishing Malt; and I do hereby declare the following to be a full, clear, and exact description thereof, which will enable those skilled in the art to make and use the same, reference being had to the accompanying drawing forming a part of this specification, in which drawing—

Figure 1:
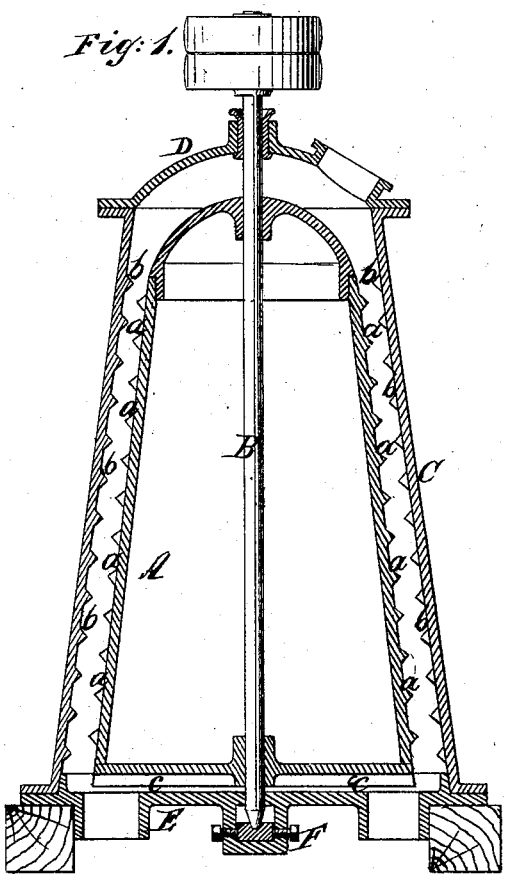
Figure 2:
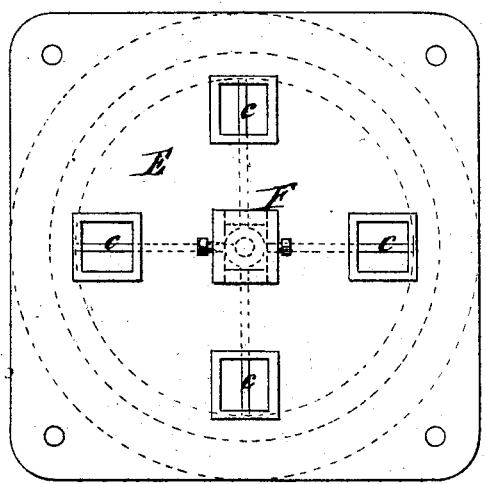

Figure 1 represents a vertical central section of my apparatus. Fig. 2 is an inverted plan of the same.

Similar letters indicate corresponding parts.

This invention consists in a drum, which is mounted on a vertical shaft, and the surface of which is provided with a series of cone-shaped projections, in combination with a shell, which incloses the drum, and the inner surface of which is also provided with cone-shaped projections, the intervening space increasing gradually from the top to the bottom in such a manner that when the drum is caused to revolve and malt is fed into the apparatus, said malt, being exposed to the action of the cone-shaped projections on the drum and on the shell, is readily polished without being crushed. The top of the shell is provided with a feed-opening, and its bottom with one or more discharge-openings, and on the bottom is cast a box for the reception of the step of the vertical shaft, said box being open at one or both sides so that the step of the shaft can be readily lubricated. Radiating ribs, projecting from the bottom of the drum, serve to carry the polished malt to the discharge-openings.

In the drawing, the letter A designates a drum, which is, by preference, made in the shape of a truncated cone, and which is mounted on a vertical shaft, B. The outer surface of the drum is provided with a large number of pointed cone-shaped projections, *a*, and said drum is inclosed in a shell, C, which corresponds in shape with the drum, and the inner surface of which is provided with pointed cone-shaped projections *b*, similar to those of the drum A. Said shell is furnished with a top, D, and with a bottom, E. On the bottom is cast a box, F, for the reception of the step of the shaft B, and said bottom is provided with one or more openings for the discharge of the malt or other material exposed to the action of my apparatus. The box F is open at one or both sides, so that the step can be easily lubricated. The top D forms the bearing for the upper part of the shaft B, and said top is provided with an aperture through which the malt is introduced. From the bottom of the drum project radiating ribs *c*, which serve to sweep the polished malt to the discharge-opening.

When the drum revolves the malt is fed in through said aperture, passes down between the conical projections of the drum and the shell, and thereby such malt becomes rapidly polished without danger of crushing or smashing the same, the shape of said projections being such that the grains are caused to roll down from one projection to the other, being alternately thrown from the drum to the shell and then back again, while they are never exposed to blows hard enough to cause them to become crushed.

The space between the drum and the shell increases from the top downward, being largest at the bottom, so that the malt in passing down gradually spreads, and all danger of packing the malt and of crushing the same is avoided.

If the space between the drum and shell is arranged as above stated, the surface of the drum and shell may be fluted instead of being provided with conical projections.

What I claim as new, and desire to secure by Letters Patent, is—

In a machine for polishing malt, the drum A having conical projections *a*, in combination with the shell C having projections *b*, the intervening space increasing gradually from the top toward the bottom, with the bottom E and its discharge-opening, with or without the radiating ribs *c*, substantially as and for the purpose described.

This specification signed by me this 12th day of April, 1873.

CHARLES STOLL.

Witnesses:
 W. HAUFF,
 E. F. KASTENHUBER.